Oct. 7, 1924.
E. L. McCORMICK
1,510,629
DIRECTION SIGNAL
Filed March 6, 1924    2 Sheets-Sheet 1
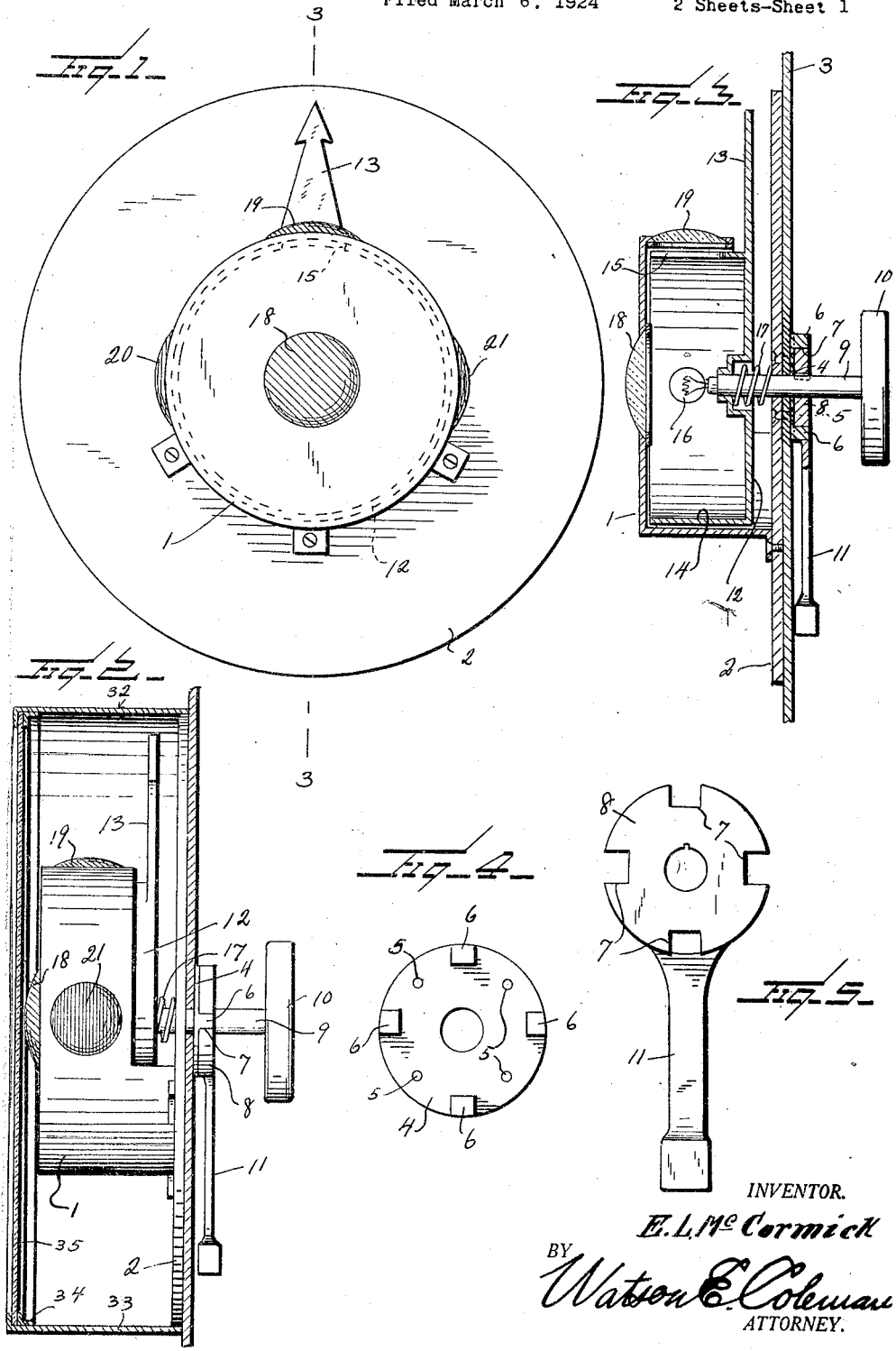
INVENTOR.
E. L. McCormick
BY
Watson E. Coleman
ATTORNEY.

Oct. 7, 1924.
E. L. McCORMICK
DIRECTION SIGNAL
Filed March 6, 1924
1,510,629
2 Sheets-Sheet 2
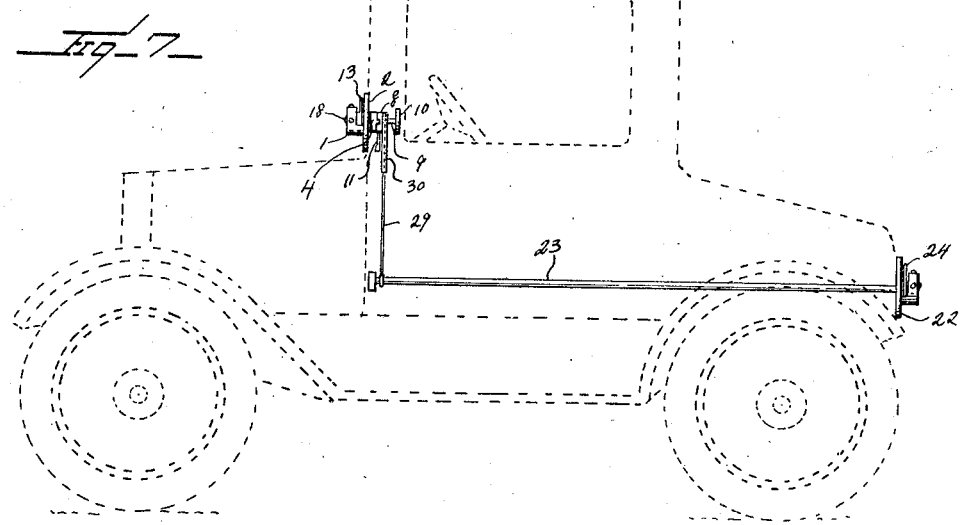
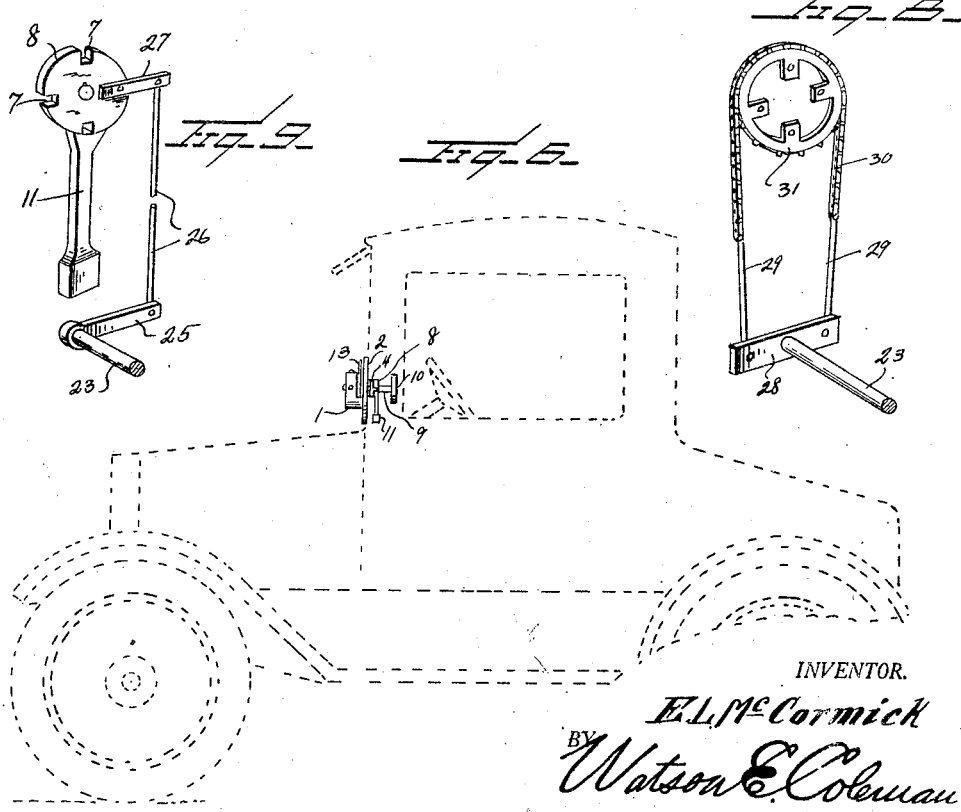
INVENTOR.
E.L.McCormick
BY Watson E. Coleman
ATTORNEY.

Patented Oct. 7, 1924.

1,510,629

UNITED STATES PATENT OFFICE.

EDMOND L. McCORMICK, OF MANHATTAN, KANSAS.

DIRECTION SIGNAL.

Application filed March 6, 1924. Serial No. 697,387.

*To all whom it may concern:*

Be it known that I, EDMOND L. MCCORMICK, a citizen of the United States, residing at Manhattan, in the county of Riley and State of Kansas, have invented certain new and useful Improvements in Direction Signals, of which the following is a specification, reference being had to the accompanying drawings.

This invention relates to an improved direction signal for use upon automobiles and other vehicles and one object of the invention is to provide a device which may be readily mounted upon the body of an automobile and operated by the driver so that when a turn is to be made a light indicating that a certain turn is to be made can be displayed and thereby permit drivers of other automobiles to be informed as to the intentions of the driver having the improved device applied to his automobile.

Another object of the invention is to so construct this device that when the automobile is traveling straight ahead a green light may be displayed above a green light provided at the center of the signal and when a turn is to be made the upper green light caused to be extinguished and a red light displayed at one side of the center green light to indicate the direction at which the turn is to be made.

Another object of the invention is to so construct this device that the colored lenses through which the light is to be displayed may be carried by a stationary casing and the light positioned at the center of a rotatably mounted inner casing which is provided with an annular wall having an opening provided therein so that by turning of this inner casing the light from the lamp may be caused to be projected through the upper green lens or through a selected side lens.

Another object of the invention is to provide improved means for rotatably mounting the inner casing and to provide improved clutch means for permitting the inner casing to be releasably held in a set position and prevented from accidentally moving out of the desired position.

Another object of the invention is to so construct this device that a signal may be provided at the front of the car and a second signal at the back of the car and the two signals caused to be operated at the same time.

This invention is illustrated in the accompanying drawings, wherein:—

Figure 1 is a front elevation of a signal embodying the improvements of my invention.

Fig. 2 is a side elevation thereof partly in section.

Fig. 3 is a vertical sectional view on the line 3—3 of Fig. 1.

Fig. 4 is a detail view looking at the working face of the clutch member carried by the dial.

Fig. 5 is a detail view of the pendulum employed.

Fig. 6 is a view illustrating the application of the device to the front portion of a motor vehicle, the latter being indicated in dotted lines, Fig. 7 is a similar view showing front and rear signals, Fig. 8 is a detail perspective view showing one means for imparting rotary movement to the shaft of the rear signal, and Fig. 9 is a detail perspective view of a modified form of shaft controlling means.

This improved signal will be used in connection with automobiles and has been shown in connection with an automobile of the closed car type. One of the signals will be mounted at the front of the car and at any suitable point where it may be readily seen by a person crossing the street in front of an automobile. The second signal will be located at the back of the automobile and can be located at any suitable point where it can be readily seen by the driver of an automobile following the one provided with the signal. In one form shown a signal has been mounted in the forward wall of the body below the windshield and this signal will now be described.

This signal is provided with a main casing 1 which is secured to the outer or forward face of a dial 2 which will be secured in any desired manner to the outer face of the wall 3 of the automobile. A hub portion 4 is disposed upon the inner wall of the automobile and may be secured to the dial by fasteners such as shown at 5 extending through the wall of the car. Lugs 6 extend rearwardly from the hub 4 and are of such size that they may fit into notches 7 formed in a clutch disc 8 readily mounted upon a shaft 9 which extends through the dial, the wall of the car and the hub and has its rear end provided with a knob or handle 10 so that the shaft may be moved longitudinally and turned when so desired. A weighted arm or pendulum 11 extends from the clutch head 8 so that when the shaft has been moved and turned to set the signal in a desired position it can be released and the weighted arm or pendulum 11 will serve to rotate the shaft and retain it in its original position with the signal indicating that the automobile is to move straight ahead. The forward end of this shaft 9 is connected with an inner casing 12 which is provided with a pointer 13 formed as an arrow extending radially of the inner casing. The annular wall 14 of this inner casing is provided with an opening 15 positioned at the base of the pointer 13 so that when an electric lamp 16, which is positioned at the center of the casing, is illuminated light may pass through this opening 15 in a direction longitudinally of the pointer 13. The shaft 9 may be formed hollow so that the wires for the lamp may pass through this hollow shaft. In order to yieldably hold the shaft against rearward sliding movement there has been provided a spring 17 which is positioned about the shaft between the dial and the inner casing. It will therefore be seen that this spring will normally hold the shaft 9 in a set position with the lugs 6 of the hub 4 fitting into the notches of the clutch forming the disc or head 8 and the arrow will be retained in an upright position under normal conditions and may be readily returned to this upright position by the action of the pendulum 11. The outer casing 1 which is secured to the dial 2 has its upper portion in spaced relation to the dial in order to permit the pointer to swing from a vertical position to a horizontal position to indicate a turn in either direction and this outer casing has its forward wheel provided with an opening in which is mounted a lens 18 which will be preferably colored green. The annular wall of the outer casing is provided with an upper opening covered by a green lens 19 and at its sides there have been provided openings covered by lenses 20 and 21 which will be colored red. In view of the fact that the inner casing is open at its forward end the light from the bulb 16 will, at all times, be directed through the lens 18 and since the pointer 13 is normally positioned in an upright position to indicate that the automobile is to proceed straight ahead the light from this lamp in passing through this opening 15 will normally be directed through the lens 19. When the shaft 9 is drawn rearwardly and turned to swing the pointer towards the right or towards the left, the opening 15 will be brought into alignment with one of the side openings of the outer casing and the light will be directed through the lens 20 or through the lens 21 according to the direction in which the inner casing is turned. The center lens 18 will at all times be illuminated and since the lenses 20 and 21 are positioned at opposite sides of this lens 18 it can be readily determined which way a car ahead is going to turn. Of course, during the day time the light does not need to be illuminated except to provide means for more readily attracting attention to the signal and the driver of a car following the one provided with the signal can see the pointer and know the direction in which it is pointed.

The rear light may be mounted at the rear of the body of the automobile and will be provided with a dial 22 positioned so that it can be readily seen. This dial is provided with a center opening through which extends a shaft 23 having a pointer 24 connected with it and adapted to swing towards the right or left according to the direction in which the shaft 23 is rotated. This shaft 23 may extend longitudinally of the automobile beneath the entrance doorway and will be rotatably mounted in suitable bearings. At its forward end it may be provided with a side arm 25 which is pivotally connected with the lower end of a link 26 extending upwardly and having its upper end connected with a side arm or lug 27 which extends radially from the clutch disc 8. Instead of providing the shaft 23 with a side arm 25 this shaft may be provided with a cross bar 28 having rods or links 29 pivotally connected with its ends and extending upwardly and connected with the ends of the sprocket chain 30 which is engaged with a sprocket wheel 31 held in engagement with the clutch disc 8 by suitable fasteners. When this form is used the sprocket wheel 31 will be turned whenever the clutch disc is turned and rotary movement imparted to the shaft 23 whenever the forward signal is moved. In the constructions just described the shaft 23 may be hollow so that wires may be passed through it to supply current for the light which will be positioned in the inner casing of the pointer 24 and cause the lenses of the outer casing of this pointer or signal to be illuminated in the same manner that the lenses of the forward signal are illuminated.

The arrangement of forward and rear lights which have been set forth above show the manner in which the forward and the rear light may be connected for simultaneously turning but it is to be understood that the forward and rear signals could be located at other points upon the automobile and suitably connected to cause the signals to be simultaneously operated.

When the device is employed as a tail light and during bad weather a cover 32 is preferably provided consisting of an angular rim portion 33 adapted to engage the perimeter of the dial 2 at one edge thereof and having at its outer edge means, as at 34, for holding a clear glass pane 35 in position. This pane will, of course, not interfere with observation of the signal but will serve to protect the same from the weather and will further serve to enable a more ready reading of the signals given during daylight hours since it will tend to assist in cutting off direct light therefrom.

What is claimed is:—

1. A direction signal comprising an outer casing having axially disposed lens and having an annular wall provided with an opening above the axially disposed lens and openings at opposite sides of the axially disposed lens, lenses being provided for covering the openings in the annular wall, an inner casing rotatably mounted in the outer casing and having a pointer extending radially from the inner casing and radially beyond the annular wall of the outer casing, the inner casing being provided with an annular wall having an opening formed therein in alignment with the pointer and adapted to be selectively moved into registry with the openings in the annular wall of the outer casing, and a lamp in the inner casing for directing light through the axially disposed lens of the outer casing and through a selected opening in the annular wall of the outer casing.

2. A direction signal comprising a dial, an outer casing secured to said dial and having an axially disposed lens and circumferentially disposed lenses, a shaft disposed axially of the outer casing and extending through the dial and rotatably mounted, an inner casing secured to the shaft and positioned in the outer casing and having an annular wall provided with an opening adapted to be selectively placed in alignment with the circumferentially disposed lenses of the outer casing when the shaft is rotated, a pointer extending from the inner casing through the outer casing in operative relation to the dial, and means for imparting rotary movement to the shaft.

3. A direction signal comprising a dial, a shaft extending through the dial and rotatably and slidably mounted, a clutch member secured to the dial, a cooperating clutch member carried by the shaft and engageable with the clutch member of the dial to releasably prevent rotary movement of the shaft, a pendulum arm carried by the clutch member of the shaft and normally positioned in depending relation to the shaft, an outer casing carried by the dial and having an end wall and an annular wall, the end wall having a lens provided therein and the annular wall having lenses spaced circumferentially of the outer wall, an inner casing carried by the shaft within the outer casing and having an opening adapted to be selectively moved into alignment with one of the lenses of the annular wall of the outer casing, a spring positioned about the shaft between the dial and inner casing to yieldably hold the shaft against sliding movement with the clutch of the shaft in operative engagement with the clutch of the dial, a pointer extending from the inner casing in operative relation to the dial, and means for drawing the shaft longitudinally against the action of the spring and imparting rotary movement to the shaft.

4. A direction signal comprising an outer casing having an end wall provided with a lens and an annular wall provided with lenses disposed circumferentially of the outer wall, a shaft extending into the outer casing, means slidably and rotatably mounting the shaft, a stationary clutch member, a clutch member carried by the shaft and adapted to be engaged with the stationary clutch member to hold the shaft against rotary movement, an inner casing carried by the shaft and positioned in the outer casing and having an annular wall provided with an opening to be selectively moved into alignment with the circumferentially disposed lenses of the outer casing through rotation of the shaft, and a spring positioned about the shaft and having engagement with the inner casing to yieldably hold the shaft against sliding movement with the clutch member of the shaft in operative engagement with the stationary clutch member.

5. A direction signal comprising an outer casing having a forward wall provided with a lens and an annular wall provided with lenses spaced circumferentially of the outer wall, a shaft extending into the outer casing, means for rotatably mounting the shaft, an inner casing carried by the shaft within the outer casing and having an annular wall provided with an opening to be moved into alignment with a selected one of the lenses spaced circumferentially of the outer casing through rotation of the shaft, a light within the inner casing for illuminating the lens in the outer wall of the outer casing and a selected one of the lenses spaced circumferentially of the outer casing, and means for releasably holding the shaft against rotary movement.

6. The structure set forth in claim 5 and a second signal including a rotatably mounted shaft, an arm carried by the shaft and extending transversely thereof, and means connected with the arm for transmitting rotary movement of the shaft carrying the inner casing to the shaft of the second signal and cause the signals to be simultaneously operated.

7. The structure set forth in claim 4 and a second signal including a rotatable operating shaft, an arm carried by the shaft of the second signal and extending transversely thereof, an arm extending from the clutch member carried by the shaft of the first signal, and a link connecting the arm extending from the clutch member with the arm of the shaft of the second signal whereby the shaft of the second signal may be rotated when the shaft of the first signal is rotated and cause the signals to be simultaneously operated.

In testimony whereof I hereunto affix my signature.

EDMOND L. McCORMICK.